United States Patent [19]
Beckman

[11] Patent Number: 5,313,831
[45] Date of Patent: May 24, 1994

[54] RADIAL JUNCTION THERMAL FLOWMETER

[76] Inventor: Paul Beckman, 944 Henrietta Ave., Huntingdon Valley, Pa. 19006

[21] Appl. No.: 922,245

[22] Filed: Jul. 31, 1992

[51] Int. Cl.$^5$ .............................................. G01F 1/68
[52] U.S. Cl. ............................................... 73/204.24
[58] Field of Search ....................... 73/204.24, 204.12

[56] References Cited

U.S. PATENT DOCUMENTS

| | | | |
|---|---|---|---|
| 2,446,283 | 8/1943 | Hulsberg | 73/204.24 |
| 2,525,197 | 10/1990 | Beams et al. | 73/204.24 |
| 2,745,283 | 5/1956 | Hastings | 73/204.24 |
| 3,592,055 | 7/1971 | Dorman | 73/204.24 |
| 3,802,264 | 4/1974 | Poppendik | 73/204.24 |

FOREIGN PATENT DOCUMENTS 1127568 9/1968 United Kingdom ............. 73/204.24

*Primary Examiner*—Herbert Goldstein
*Attorney, Agent, or Firm*—Paul Maleson

[57] ABSTRACT

A thermal flowmeter to measure the rate of flow of a fluid in a conduit is provided. An important characteristic of the flowmeter is that it includes two radial junction thermocouples, one of them a downstream radial junction thermocouple and the other an upstream radial junction thermocouple. A heat source to supply heat to the conduit and fluid is provided. The heat source supplies heat preferentially to one of the radial junction thermocouples, preferably to the downstream one. The differential output of the two radial junction thermocouples is measured and is an index of the rate of flow of the fluid. Compensating temperature sensing means is provided to measure the base or process temperature of the fluid before it is affected by the heat source, to provide a base for the differential output. The flowmeter can be constructed in many different embodiments. A method of measuring flow, mass flow and viscosity using radial junction thermocouples is provided.

17 Claims, 3 Drawing Sheets

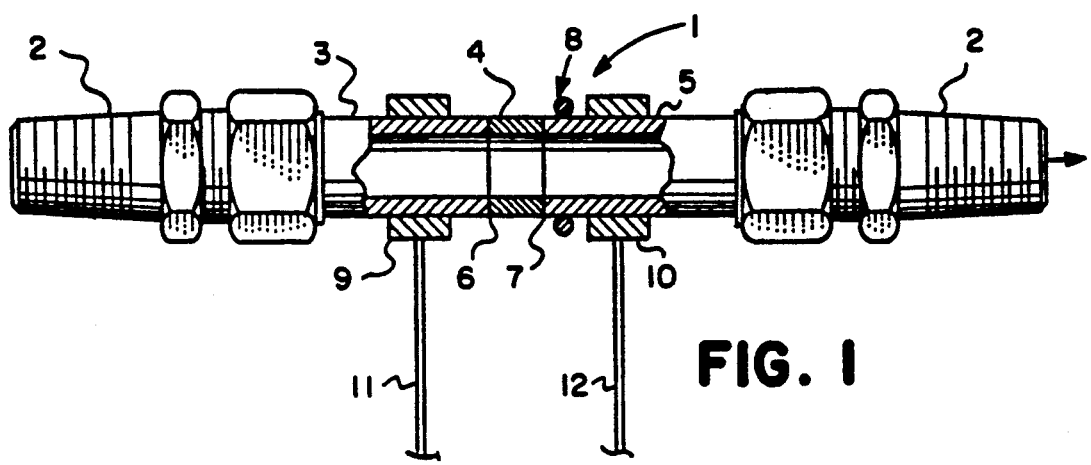
FIG. 1
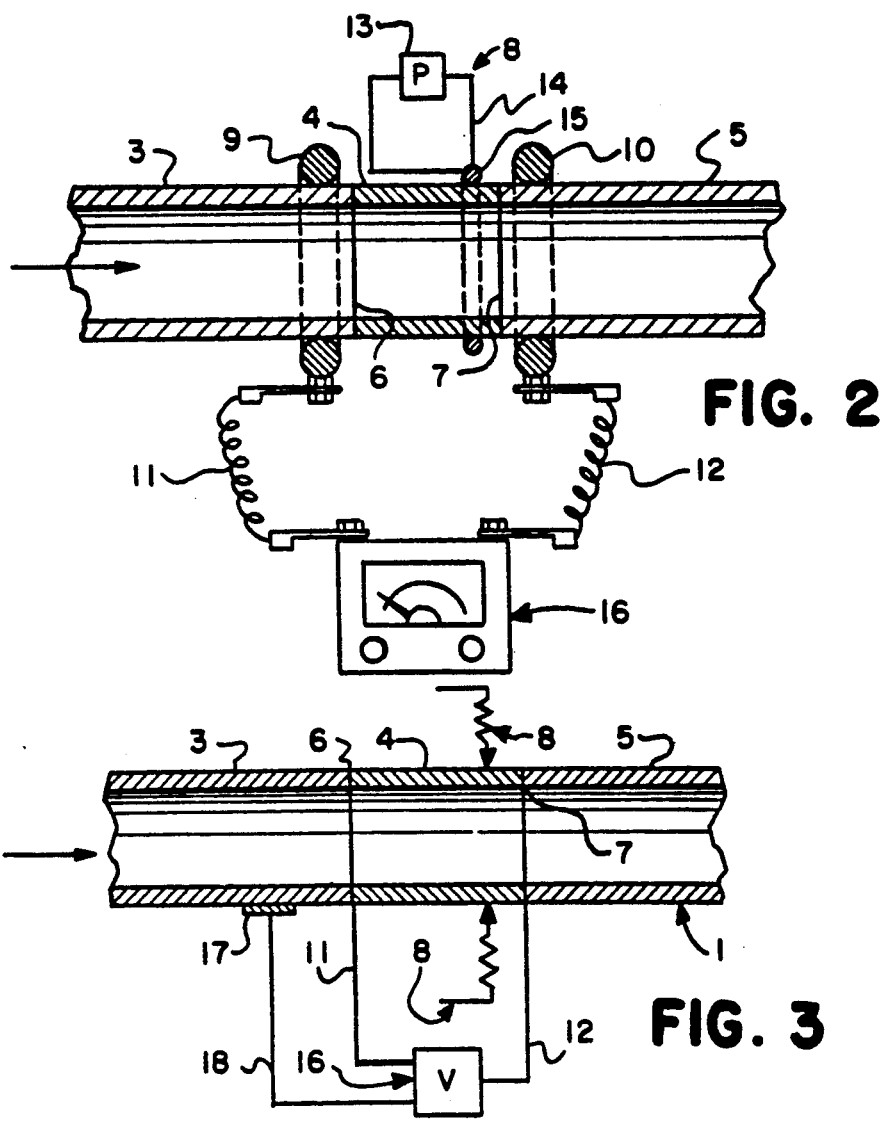
FIG. 2
FIG. 3

RADIAL JUNCTION THERMAL FLOWMETER

BACKGROUND OF THE INVENTION

1. Field of the Invention

This invention relates to flowmeters. More particularly it relates to thermal flowmeters to measure the flow of fluids, liquid or gas, in a conduit. Thermal flowmeters have been known. Many of the preferred or necessary associated elements and techniques are in themselves known. The particular and important contribution of this present invention is the concept of using a pair of radial junction thermocouples for sensing the temperature as part of the flow measuring process.

Previous flowmeters utilized different theories of operation. A great many of them require the insertion of some form of obstruction or impediment into the path of the flowing fluid. The present invention permits the use of an absolutely smooth and unobstructed and unimpeded interior flow path through the conduit. In fact, the flowing fluid "sees" no difference in its pipe or conduit whether it is passing through the flowmeter or not.

In the known development of thermal flowmeters, the use of thermocouples as the sensing elements has been known. However, it is not believed that there has been any prior disclosure of a radial junction thermocouple in the application or environment of the radial junction thermocouple surrounding a conduit through which flow flows.

In addition to the advantage of avoiding obstructions, reductions or impediments in the conduit, a very significant advantage accrues through using a radial junction thermocouple as opposed to a conventional thermocouple or a point thermocouple. Some of the advantages of the present invention's radial junction thermocouple thermal flowmeter include very fast response time, very high sensitivity, very high repeatability, very high turndown ratio, avoidance of interference of the fluid flow characteristics or disturbance of the normal flow, much greater accuracy and stability of readout because of the inherently great temperature sensing averaging function or characteristic, much greater current output because of the much greater length of the dissimilar metal interface.

Other advantages of the present invention include the fact that it is applicable to a very great range of rate of flow, a very great range of characteristics of the flow, that is, its viscosity, density, pressure, temperature and the like, and to a very great range of size of the system in which it is incorporated. That is, this invention has applicability to very small miniaturized systems, such as are found in analytical laboratories or in clinical medical applications, with conduit sizes on the order of magnitude of $\frac{1}{8}$" for example. It also has application to very large chemical process and materials handling applications involving conduits having internal diameters measuring in terms of feet or meters.

2. Description of the Prior Art

It is old and common to provide measurement of fluid flow in a conduit by means of two temperature sensors spaced along the conduit, and a heater to provide heat to one of the sensors preferentially when fluid is flowing, and to measure the differential output of the sensors. Such sensors may be thermoelectric. An example is paragraph 4.3.6 in "Handbook of Transducers for Electronic Measuring Systems", Harry N. Norton, Prentice-Hall, 1969. Another is pages 142-144 in "Instrument Engineers Handbook", Liptak and Venczel, Chilton Book Company, 1969, 1982. Another is U.S. Pat. No. 4,255,968, which also discloses one prior art example of the electronic circuitry. U.S. Pat. No. 4,460,802 discloses a radial junction thermowell. A number of other patents disclose thermocouples mounted on conduits, including U.S. Pat. Nos. 3,444,740; 3,874,239; 2,752,411; 2,048,680; 3,901,080; 3,143,439; 3,099,922; 2,607,808; 4,164,433; and 4,447,6587. None of these patents or other references, taken individually or together in their teachings, suggest the radial junction thermocouple flowmeter of the present invention.

SUMMARY OF THE INVENTION

This invention lies in the fields of flowmeters for measuring fluid flow in conduits. It is a type of thermal flowmeter. The thermal sensors are thermocouples. It is particularly characterized in that there is a first upstream radial junction and a second downstream radial junction thermocouple. The differential electrical output of these radial junction thermocouples is measured by known conventional means. For a fluid having given characteristics and process conditions, the differential output of the radial junction thermocouples can be calibrated against rate of flow. Thus, a flowmeter having many advantages over prior expedients is obtained. A necessary aspect of the flowmeter is the provision of means to provide heat to the conduit (and indirectly to the flowing fluid), with that source of heat being preferential to one or the other of the radial junction flowmeters. In practice, the heat supply may be positioned between the two radial junction thermocouples, or preferably, closer to the downstream radial junction thermocouple, or more preferably, the heat may be supplied right at the position of the downstream radial junction thermocouple. It is desirable to have the heat supply be substantially constant to produce accurate readings.

In practice, it is highly desirable to know the base or process temperature of the flowing fluid, in order that an accurate indication of the rate of flow may be obtained. This base or process temperature may be obtained by a compensating temperature sensor, which preferably is a temperature sensor located upstream from the heat supply. The compensating temperature sensor may itself be preferably a radial junction thermocouple.

When the diameter of the pipe is known, and the specific gravity or density of the flowing fluid is known, the mass rate of flow may be determined. If in addition, the pressure of the fluid is known, the viscosity may be determined. More elaborate embodiments of the present invention contemplate the use of differential circumferentially positioned strain gauges on sections of the conduit wall having different thicknesses, whereby differential electrical output of the strain gauges produces a signal that may be calibrated to indicate pressure. The combination of rate of flow, temperature, pressure, and knowledge of other physical characteristics to flowing fluid at these sensed conditions can mathematically provide a measurement of rate of flow, mass flow and viscosity.

BRIEF DESCRIPTION OF THE DRAWINGS

FIG. 1 is an elevation view, partly in broken-away cross-section, of the most critical elements of the flowmeter in a pipe fitting;

FIG. 2 is a cross-sectional view of the central section of FIG. 1, enlarged, showing additional electrical elements.

FIG. 3 is a simplified cross-sectional view of a flowmeter schematically showing the heater and compensating temperature sensor;

DESCRIPTION OF THE PREFERRED EMBODIMENTS

Figure 4:
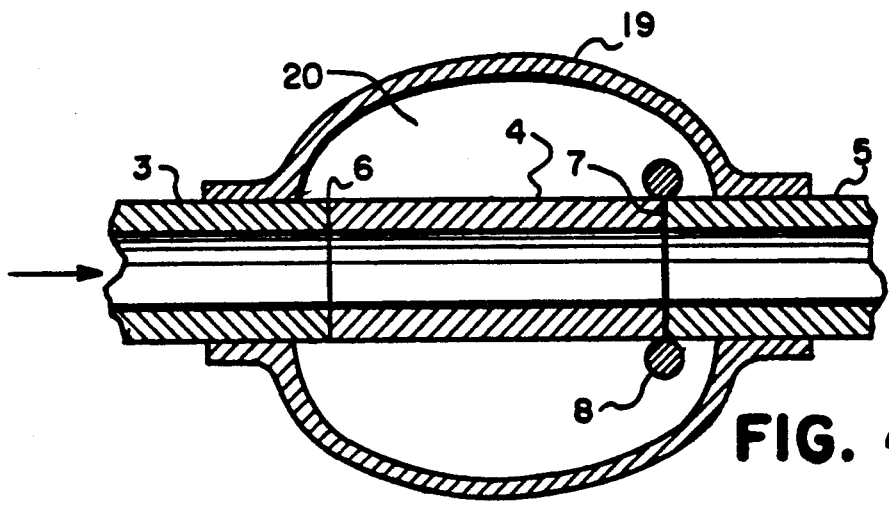
FIG. 4 is a simplified schematic cross-sectional view showing critical elements of the flowmeter with an insulating jacket.

A broad principle of operation may be described as follows: two radial junction thermocouples, TC1 and TC2 are fabricated in the wall of a pipe. The upstream TC1 gives a first temperature of which may be called the base or process temperature, T1. The downstream thermocouple, TC2, which is heated, gives a second or wall temperature, T2.

The general expression for heat transfer is given by the equation $$Q = hA \text{ delta } T$$

where
Q = heat transfer rate, BTU/hr
h = heat transfer coefficient, BTU/hr/sq. ft./degrees F.
A = area of heat transfer surface, sq. ft.
delta T = temperature difference, TW−TP
T1 = wall or second temperature, degrees F.
T2 = process or base or first temperature, degrees F.

In laminar flow, the functional relationship for the heat transfer coefficient is:

$$h = f(k, c, w, D, L)$$

where
k = thermal conductivity, BTU/hr./sq.ft./degrees F.
c = specific heat, BTU/lb./degrees F.
W = mass flow rate, lb./hr.
D = diameter, ft.
L = heated length, ft.

For a given fluid over a limited temperature range, c and k are constant, D and L are geometric constants related to the flowmeter configuration. At laminar flow conditions for a given mass flow rate (W), there is a unique associated heat transfer coefficient (h). A typical expression for the heat transfer coefficient is:

$$h = K/D \left( 3.66 + \frac{.0668 \ (D/L) \ (Rey) \ (Pr)}{1 + .04 \ (D/L) \ (Rey/Pr)} \right)$$

where Rey = Reynolds number; Pr = Prandtl number

This expression for h in conjunction with the measured values for the fluid temperature allows determination of the velocity (and thus mass flow rate) provided the viscosity of the fluid is known as a function of temperature.

Some typical specifications for one class of low flow-rate systems are:
Line sizes: ¼", ⅛", ⅜" and ½"
Operating Pressure: 1200 psig
Operating temperature:
 Sensor: −150 to 500+ degrees F.
 Electronics: 0 to 140 degrees F.
Minimum Flow Rate: Less than 0.01 lbs./hr.
Repeatability: ±1% Full Scale
Turndown Ratio: 100/1
Rate of Mass Flow Range: 4 gms/hr−400 gms/hr
Output: 4−20 ma or 0−10 VDC
Power: 115/230 VAC, 50/60 Hz A critical characteristic or feature of this present invention is the incorporation of radial junction thermocouples to act as the temperature sensing elements in a thermal flowmeter. A primary and preferred embodiment of this critical and essential aspect of the invention is perhaps best initially appreciated in connection with the simplified schematic fragmented cross-sectional illustration of FIG. 3. A flowmeter, generally designated 1, is provided. An arrow shows the direction of flow of a fluid, liquid or gas, through the flowmeter. The flowmeter 1 is, when physically viewed from the interior, a simple continuation or extension of the pipe or conduit through which the fluid is flowing. In fact, in the preferred embodiment, portions of the pipe are active parts of the flowmeter itself. In FIG. 3, the upstream portion of the conduit is designated 3 and the downstream portion is designated 5. As an example only, the material of conduit portions 3 and 5 may be 316 stainless steel.

The run of the conduit 3,5 is interrupted by an inserted conduit section 4 of a metal characterized by being thermoelectrically dissimilar to main conduit portions 3 and 5. As an example only, conduit section 4 may be chromel. In a simplified fundamental form of the invention, the upstream of first radial junction thermocouple 6, between conduit 3 and conduit section 4, and the second or downstream radial junction thermocouple 7, between conduit section 4 and conduit 5, are flush butt joints extending entirely through the conduit wall from the exterior to the interior, and are made in any conventional manner, including brazing, welding, or soldering, as appropriate.

The thermoelectric effect of the junction of various combinations of metal is well understood and old in the art. Some of the metals used in the thermocouple art include, monel, hastalloy, 316 stainless, constantin, copper, chromel, and other metals. The principle of operation of the present invention is not dependent on any particular combination or selection; the choice is one of design depending on constraints appropriate to the particular application.

A heat supply 8 is provided. This heat supply injects heat, preferably at a constant regulated rate, to the conduit. At least part of that injected heat is carried away by the fluid flowing past the point or area of the heat introduction. Broadly speaking, a taking away of heat at the point of heat supply 8 is also effective in the operation of this flowmeter. Thus, what may be termed an "injection of cold" could be obtained as by thermoelectric cooling or some other negative heat supply source. Such a variation may be useful in dealing with certain fluids as to which no added heat is permitted. It is necessary that the heat introduced from heat supply 8 influence one of the radial junction thermocouples more than the other. That is, the heat must be injected preferentially to one or the other junctions. Generally, it is the downstream junction 7 which is preferentially heated. The heat supply 8 may thus be positioned as close as is physically convenient to the downstream or second junction 7. As shown in FIG. 3, the heat supply 8 is positioned between the junctions, but very much closer to junction 7. The heat supply 8 could be positioned exactly at the downstream junction 7. The heat supply 8 may be an electrical resistance heater. It is highly desirable to have the amount of heat produced by the heat supply be a constant, even if ambient temperatures vary. It is known in the art to provide resistance heating elements which have temperature coefficients that tend to remain stable over a wide temperature range. One useful material having this characteristic is available under the trademark Karma. It is also preferable to provide a stable power supply to the heater. Stable power supplies are known and conventional in the art. To the extent that the heat input from heat supply 8 varies, the flowmeter reports a spurious signal, so it is desirable to keep this stable to improve overall accuracy.

A pair of leads 11 and 12 take off from the radial junction thermocouples 6 and 7 respectively. They lead to means to measure the differential electrical output of the two junctions. In FIG. 3, this means is shown as a voltmeter V generally designated 16. In its broadest and simplest form, such a differential output measuring device between a cold and a hot thermocouple junction is very old and known in the art.

As is so far described, the present invention is operable in principle. Many of the additional embodiments and elements, both as described in connection with FIG. 3 and the other figures, serve to increase the utility of the basic invention. For example, in the embodiment so described in connection with FIG. 3, if the process or base temperature of the fluid remained constant, an accurate flow rate would be indicated as a mathematical function of the measurement of measuring means 16. If however, the process or base temperature varied, the relationship between flow rate and electrical differential might vary at the different base temperatures, depending on the nature of the fluid. Furthermore, in the thermoelectric effect itself, equal differentials on different base temperatures cannot be depended upon to relate to the same rate of flow. Therefore, a compensating temperature sensor 17 is provided, preferably upstream from the other elements of the flowmeter. It measures the base or process temperature of the fluid before it is affected by the heat supply 8. This sensor's output is connected by lead 18 to the electrical measuring device 16 and provides through appropriate conventional circuitry, not shown, the correction in accord with calibration.

The compensating temperature sensor 17 is shown in FIG. 3 as a simple point device as a thermistor, point thermocouple, or resistance device. Preferably, to take advantage of the full possibilities of accuracy of the present invention, the sensor 17 should itself be a radial junction thermocouple, as it is shown as such in FIG. 9. It is shown simplified in FIG. 3 for ease of presentation.

While, for ease of presentation and to point out the novel and inventive features of the present invention, the means 16 is described as a simple voltmeter, it is apparent that in practice, more sophisticated electronic means may be used. For example, for given system specifications and fluids, the mathematical relations between differentials and rates of flow are calibrated. To the extent that this relationship differs depending on the base or process temperature, such variations in the curve are also calibrated. This information (and any other pertinent calibratable information) is typically digitally encoded. The analog outputs from the radial junction thermocouples and the compensating temperature sensor may be digitized by an A to D converter, and a program may thus produce a reading that may be displayed, recorded or transmitted, giving the flow rate, the mass flow rate, or viscosity when combined with other elements in other embodiments. For example, it is well known that the true voltage output of a differential thermocouple is a log function with relation to the rate of flow. This relationship is linearized electronically within the means 16 by conventional circuitry. An example of an algorithm and circuitry in this art is disclosed in U.S. Pat. No. 4,255,968, and suitable electronics are obtainable from Electron Machine Corp. of Florida., for example, and are within the routine design capabilities of many other companies.

In the drawings, like reference numerals refer to like parts and where the meaning of a reference numeral has been discussed, it may not be further discussed in connection with another figure. FIG. 1 is a less abstract and simplified showing of the most critical elements of the flowmeter. The radial junction thermocouples and their leads are shown as part of a pipe fitting for insertion into a pipe, provided with screw couplings and flanges 2 for conventional connection into matching fittings in an interruption in a pipe.

FIG. 2 is an enlargement of the central section of FIG. 1. The connections 9 and 10 to the radial junction thermocouples 6 and 7 respectively are shown in more than schematic detail. A convenient place for attachment of the connections 9 and 10 is just upstream of junction 6 and downstream of junction 7, as shown. The connections 9 and 10 are shown as fully circumferential straps to aid in good electrical connections and thus to low resistance. The heat supply, generally designated 8, includes the power supply P, 13, connected by circuit 14 to a resistance heating element 15. As shown, the resistance heating element 15 is a full circumerential resistance heater. It is positioned just upstream of radial junction thermocouple 7 and very close to it.

FIG. 4 is a simplified abstract showing of essential elements of the invention with an insulating sleeve 19. As shown the insulating effect is provided by an air gap 20 within the sleeve 19. It is desirable to shield the temperature sensing elements of the flowmeter from ambient temperature variations to aid in accuracy. The insulating medium can of course be a material known in the art other than air, such as glass wool fibers for example.

Figure 5:
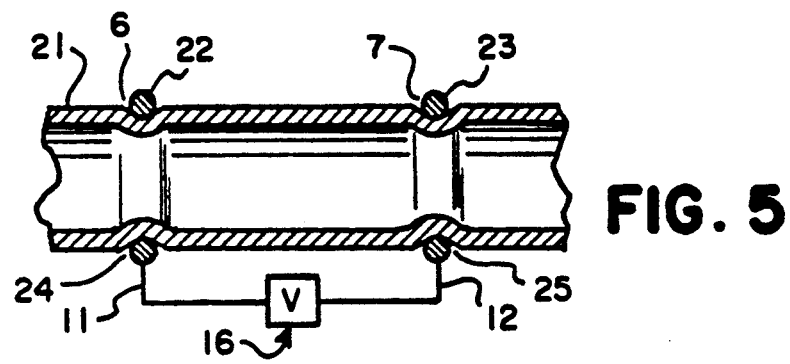
FIG. 5 is a simplified schematic cross-sectional view of the critical elements of another embodiment of the flowmeter.

FIG. 5 is a simplified abstract showing of essential elements of the flowmeter in an embodiment with a different physical construction from that described above. The conduit or pipe 21 is continuous and uninterrupted and the interior surface of the conduit presents the same metal to the fluid, without change. In certain applications, as in the food industry or certain chemical applications, this continuity of metal surface may be important, and many of the advantages of the present invention can be obtained within this constraint. The conduit 21 is corseted or necked in circumferentially at radial junction thermocouples 6 and 7. This produces a circumerential depression on the outer surface of the conduit. A wire or strap 22 of metal thermoelectrically dissimilar to the metal of conduit 21 is wrapped circumferentially around the conduit 21 in the depression or groove 22 to form the radial junction thermocouple 6. Similarly, a wire or strap 23 is provided in groove 23 to make radial junction thermocouple 7. This embodiment provides economies of fabrication and preserves the metal integrity of the interior surface. It does sacrifice some degree of potential response time and other advantages of the invention and it does introduce an impediment into the path of fluid flow.

Figure 6:
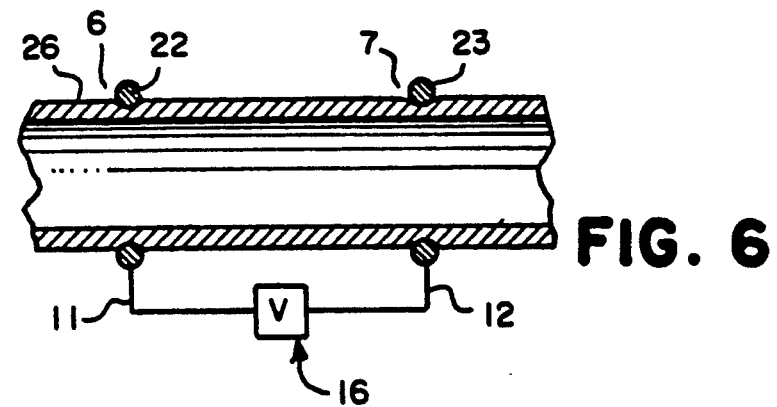
FIG. 6 is a simplified schematic cross-sectional view of critical elements of yet another embodiment of the flowmeter.

FIG. 6 is a simplified abstract showing of some essential elements of the flowmeter of an embodiment allied to that of FIG. 5. In the FIG. 6 embodiment, an uninterrupted continuous pipe or conduit 26 is provided, maintaining the same metal surface presented to the fluid. The inside surface of conduit 26 is maintained smooth and unobstructed however. Instead of grooves being pressed into the outer surface to corset the pipe, the grooves or depressions are cut or milled into the outer surface. The same radial junction thermocouples and associated elements may then be provided as described above. An advantage of the FIG. 6 embodiment is the smooth and unobstructed flow path. A disadvantage is the change of wall thickness, which could be an adverse factor in a high pressure situation.

In both the embodiments of FIG. 5 and FIG. 6, the wrapped wires 22 and 23 may preferably be soldered, packed, secured, or sealed into the depressions or grooves, as by a cement for example.

Figure 7:
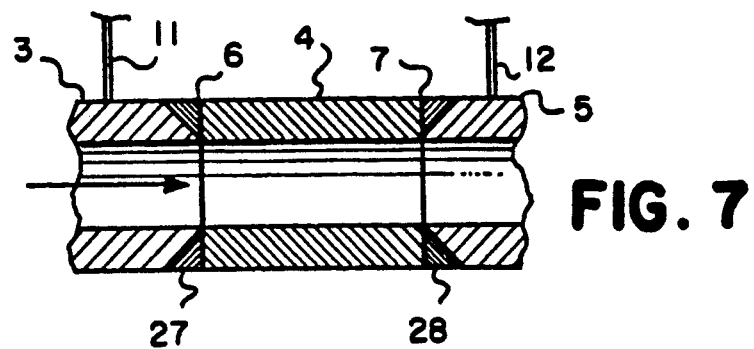
FIG. 7 is a simplified schematic cross-sectional view of critical elements of the flowmeter showing a filled-wedge weld junction.

FIG. 7 is a simplified abstract showing of some essential elements of a further embodiment of the flowmeter. The junction faces, instead of being flush and butted, are welded in accord with certain accepted welding practices. The ends of the original main conduit portions, upstream portion 3 and downstream portion 5, are cut at an angle to the transverse cross-section, as shown. The metal of portions 3 and 5 directly contacts the dissimilar metal conduit section 4 circumferentially but only at an edge at the inner surface of the conduit section 4. The wedge shaped spaces 27 and 28 respectively resulting between conduit portion 3 and conduit section 4 on one hand and conduit portion 5 and conduit section 4 on the other hand are filled by weld metal, as from a weld rod, during the welding process. This weld metal is preferably and generally the same metal as the conduit portions 3 and 5. This embodiment has particular applicability to flow rate measurement of gas as the flowing fluid.

Figure 8:
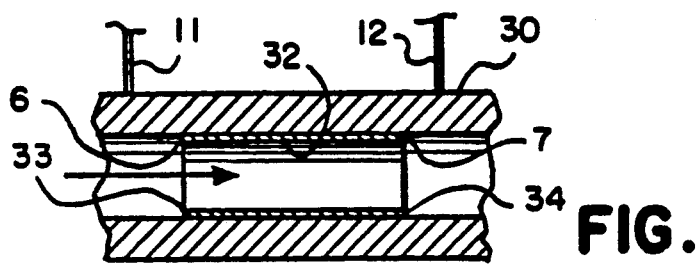
FIG. 8 is a simplified schematic cross-sectional view of the critical elements of still another embodiment of the flowmeter.

FIG. 8 is a simplified abstract showing of a still further embodiment of the flowmeter. This embodiment is particularly suited for very small conduit diameters, as for example on the order of ¼" or less, as may be useful in medical applications. An uninterrupted continuous conduit 30 of a first metal is provided. An interior sleeve 32, circumferentially around the interior surface of the conduit is provided for a distance within the flowmeter. This sleeve 32 is of a metal that is thermoelectrically dissimilar to that of the main conduit metal 30. The leading or upstream edge 33 of the sleeve makes the first or upstream radial junction thermocouple 33 and the trailing or downstream edge 34 makes the second or downstream radial junction thermocouple 7. The drawing shows the sleeve 32 thicker with relation to the conduit wall than it is in practice. It may, for example, be as thin as on the order of being measured in mils.

Broadly, the sleeve or layer 32 can be affixed to the conduit in any conventional manner, but in practice, this construction has particular adaptability to being made by plating the sleeve or layer 32 on to the conduit 30. The layer thus plated is so thin as to minimize or reduce to insignificance the obstructive effect to the fluid flow. The preferred location of the sleeve 32 is on the interior surface of the conduit 30 as shown. However, it is also possible to obtain the principle of operation of this flowmeter by plating or otherwise providing the sleeve on the outside surface of the conduit. An outside sleeve, like all embodiments that do not have the two-metal junction in direct contact with the fluid, lose something in response time and other advantages of the invention.

Figure 9:
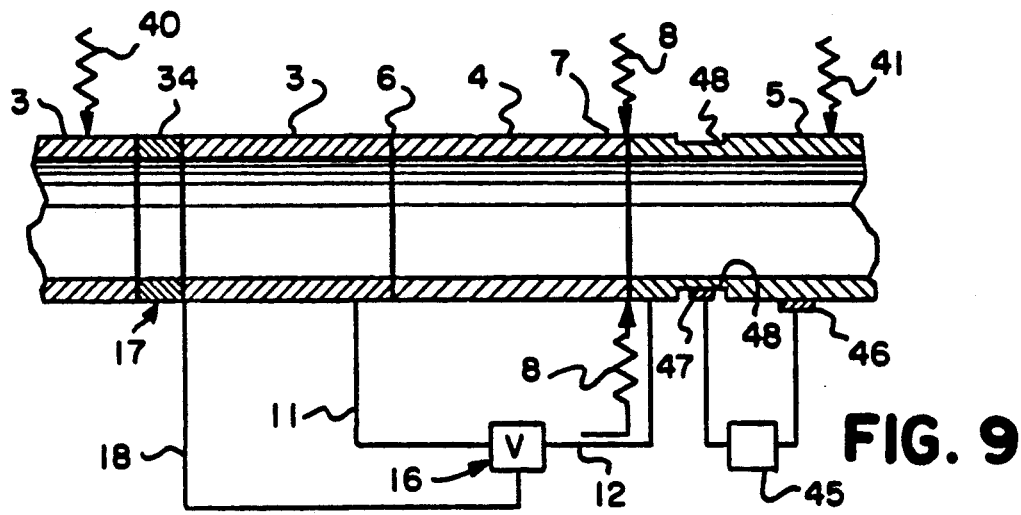
FIG. 9 is a simplified schematic cross-sectional view of the flowmeter comprising part of a viscosity meter.

FIG. 9 is a simplified abstract showing of essential elements of a viscosity meter based on the flowmeter, and showing other elements of the flowmeter. Considered solely as a flowmeter, FIG. 9 shows the addition of a pair of guard heaters. A first or upstream guard heater 40 is positioned to provide heat to the fluid upstream of the flowmeter and a second or downstream guard heater 41 is positioned to provide heat to the fluid downstream of the flowmeter. Such guard heaters are useful in certain applications when it is desirable or necessary to maintain the flowing fluid at a desired temperature or within a desired range during its passage through the flowmeter or viscosity meter. This requirement may arise, for example, in the case of liquified plastics whose viscosity is high and sensitive to temperature variations.

Also shown in FIG. 9 is a compensating temperature sensor 17, with a function as has been described, comprising a radial junction thermocouple made by temperature sensing conduit section 34 of a metal thermoelectrically dissimilar to the main conduit metal 3.

A pressure measuring means is included in the assembly to form the elements needed to provide a viscosity meter. The pressure measuring means is based on strain gauge measurement of hoop stress differentials. The wall thickness of the conduit is altered at 48, here shown as a circumferential reduction in diameter, as by a cut or milled groove. A first circumferentially oriented strain gauge 47 is provided at the reduced wall thickness position and a second circumferentially oriented strain gauge 46 is provided at an unaltered wall thickness position of the conduit. The differential strain in many applications is measured on the order of microinches. A conventional and well known half-bridge circuit generally designated 45 is used to provide the output which is an index of the pressure in the conduit.

When the measurements obtainable from the flowmeter portion of the assembly are combined with the pressure measurement together with other pre-known specifications of the fluid, the viscosity may be determined by known mathematical relationship. This many be down manually in steps or the inputs may be all processed by digital or other processing together in accord with known and conventional technology to give direct automatic viscosity readouts.

The algorithm for viscosity measurement using an apparatus and method such as is disclosed herein is:

$$\mu = \frac{\Delta P \, d^4 \, 10^9}{6 \, V L}$$

Where
$\mu$ = absolute viscosity in centipoises;
$d$ = inside diameter of conduit in inches;
$\Delta P$ = pressure drop across length of conduit in lbs/sq. in.;
$V$ = flowrate in gals/hour; and
$L$ = length of conduit in inches.

With relation to the structure disclosed in FIG. 9, the length L is the length between the two strain gauges 46 and 47. The structure disclosed in FIG. 9 is particularly useful in connection with flowing fluids having relatively low viscosities. Such viscosities, as a matter of example only, may be on the order of magnitude of 600 centipoises, as is glycerin, one centipoise, water, or even lower viscosities. At low viscosities, the pressure drop along reasonable or practical or convenient lengths L is small and is hard to reliably pick up by measurement of different strains in conduit walls if those walls are relatively thick. By making one of the strain gauges act on a relatively thin wall, 48, a useful reading may be obtained. This is because where there is a relatively thin wall, a relatively small change in pressure results in a larger amount of strain in the wall, and thus provides a more useful differential. The effect of this variable wall thickness differential strain gauge pressure sensor is more logically appreciated if it is conceived with the reduced wall thickness located downstream from the other strain gauge.

Where the flowmeter is used for relatively high viscosity materials, such as flowing molten plastics, which may have a viscosity on the order of magnitude of 1 million centipoises, there is a much more significant pressure drop along the length L. Thus, when dealing with relatively high viscosity materials, strain gauges on equal wall thicknesses do produce a useful differential.

Figure 10:
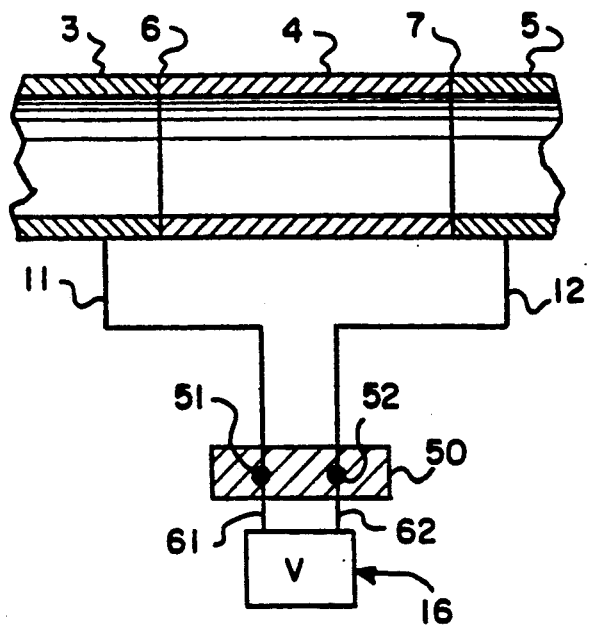
FIG. 10 is a simplified schematic cross-sectional view of some critical elements of the flowmeter showing a type of lead connection to improve accuracy.

FIG. 10 is a simplified abstract showing of essential elements of a flowmeter with an additional provision for increasing accuracy. The leads 11 and 12 from the radial junction thermocouples 6 and 7 respectively are the same conductive metal as the conduit portions 3 and 5 respectively to which they are attached. It is desirable that these leads become ordinary copper conducting wire to keep system resistance low and conform to ordinary usage. Lead 11 joins copper wire 61 at lead junction 51. Lead 12 joins copper wire 62 at lead junction 52. It is desirable to keep lead junctions 51 and 52 at the same temperature so as to prevent an unwanted differential thermoelectrical output from these junctions. Such an output would degrade the desired signal from the fluid flow. The junctions 51 and 52 are within a relatively large heat sink 50, which may be a copper block. This tends to keep the junction temperatures the same.

The flowmeter of the present invention is dependent upon the use of radial junction thermocouples for its most important critical advantages. Compared to conventional differential thermocouple flowmeters, using essential point or small contact area thermocouples, the present invention has a very low resistance. It may be measured in an order of magnitude of 1/100 ohms. Unlike conventional thermocouples, it is not a zero current device. Its output of current cannot be disregarded. Thus, although thermocouple outputs are generally measured as emf or voltage, the output of the present invention may be more broadly described as an electrical output. The voltage output is the same as if the thermocouples were conventional, but the current, and hence the power output are greatly increased. Thus, there is less system noise and the output is easier to amplify with accuracy.

The radial junction thermocouple averages the temperature of the flowing fluid around the circumference of the conduit. Thus, it is more stable and gives a more representative and accurate reading than can a point reading. Its greater mass compared to a point sensor gives it a greater heat capacity which leads to a greater range.

A conventional thermocouple may have a turndown ratio of about 10 to 1. That is, when used in a flowmeter, it could measure a range of flow of between about 1 and 10 cc/min. The flowmeter of the present invention, using radial junction thermocouples, may have a turndown ration of 200/1 or even 400/1 in some cases. Thus, it is usable over a much wider range of flows with a single range setting.

Those embodiments in which the junction is in direct contact with the flowing fluid offers the most preferable form of the invention. The particular concept of the radial junction thermocouple around the circumferential boundary of a flowing fluid provides a greater possibility of accuracy and fast response time than other expedients.

The radial junction thermocouple of this invention might well be described as a circumferential junction thermocouple. It is characterized by surrounding the flowing fluid and thus in effect sampling the temperature of the flowing fluid at an infinite number of points around the circumferential boundary of the fluid. In its purest, most logical and preferred form, the thermocouple surrounds the fluid in a 360 degree loop. For some mechanical or other physical reason, there may be some diminution of the full 360 degrees, as for example to accommodate connectors or some other element. This does not avoid the scope of the term radial junction thermocouple. There might be a reduction from the full 360 degrees in an attempt to avoid the coverage of the patent or for some other reason, but it is understood that while the advantages of the present invention reach their fullest and preferred form in a full circumferential surround, the principle of the invention persists even in reduced circumferential extent.

I claim:

1. A thermal flowmeter to measure the rate of flow of a fluid in a conduit having an interior surface, comprising a first upstream radial junction thermocouple, a second downstream radial junction thermocouple, a heat source to supply substantially constant output heat to at least one of said radial junction thermocouples and to said fluid in said conduit, said heat source being positioned with respect to said first and second radial junction thermocouples to supply more heat to one of said thermocouples than the other, means to detect and measure the differential electrical output between said thermocouples, said differential output being mathematically related to said rate of flow of said fluid, each of said radial junction thermocouples being a circumferential junction of thermoelectrically dissimilar metals forming at least part of said interior surface of said conduit through which said fluid flows, and forming a complete circumferential boundary surrounding said fluid.

2. A thermal flowmeter as set forth in claim 1 wherein a compensating temperature sensing means is provided positioned upstream with respect to said heat source to measure the temperature of said fluid before it is affected by said heat source, to provide a base for said differential output.

3. A thermal flowmeter as set forth in claim 2 wherein said compensating temperature sensing means is a radial junction thermocouple.

4. A thermal flowmeter as set forth in claim 1 wherein said heat source is positioned substantially at said second downstream radial junction thermocouple.

5. A thermal flowmeter as set forth in claim 1 wherein said heat source is positioned between said first upstream radial junction thermocouple and said second downstream radial junction thermocouple, closer to said second downstream radial junction thermocouple.

6. A thermal flowmeter as set forth in claim 1 wherein a conduit of a first metal is interrupted by a conduit section of a second metal, thermoelectrically dissimilar to said first metal, the first upstream circumferential junction between said conduit and said dissimilar conduit section comprising said first upstream radial junction thermocouple and the second downstream circumferential junction between said conduit and said dissimilar conduit section comprising said second downstream radial junction thermocouple.

7. A thermal flowmeter as set forth in claim 1 wherein at least two guard heaters are provided for said conduit and said flowing fluid, said guard heaters being spaced along said conduit before and after said flowmeter, whereby the general base temperature of said fluid is brought into a desired range for flow measurement.

8. A thermal flowmeter as set forth in claim 1 wherein said heat source is a resistance heater having a temperature coefficient sufficiently stable over the temperature range expected in the flowing fluid to prevent temperature fluctuations from affecting the flowmeter output over said temperature range.

9. A thermal flowmeter as set forth in claim 1 wherein said flowmeter is thermally insulated from the surrounding environment.

10. A thermal flowmeter as set forth in claim 9 wherein said radial junction thermocouples have leads of the same metal as that portion of the thermocouple to which said leads are attached, and said same metal leads each terminate in lead junctions to copper wire conductors, and said lead junctions are within a heat sink, whereby said lead junctions are maintained at the same temperature and reduce spurious signals.

11. A thermal flowmeter as set forth in claim 9 wherein said flowmeter is thermally insulated by an air gap.

12. A thermal flowmeter as set forth in claim 9 wherein said flowmeter is thermally insulated by solid insulation material.

13. A thermal flowmeter to measure the rate of flow of a fluid in a conduit, comprising a first upstream radial junction thermocouple, a second downstream radial junction thermocouple, a heat source to supply substantially constant output heat to at least one of said radial junction thermocouples and to said fluid in said conduit, said heat source being positioned with respect to said first and second radial junction thermocouples to supply more heat to one of said thermocouples than the other, means to detect and measure the differential electrical output between said thermocouples, said differential output being mathematically related to said rate of flow of said fluid wherein a conduit of a first metal is interrupted by a conduit section of a second metal, thermoelectrically dissimilar to said first metal, the first upstream circumferential junction between said conduit and said dissimilar conduit section comprising said first upstream radial junction thermocouple and the second downstream circumferential junction between said conduit and said dissimilar conduit section comprising said second downstream radial junction thermocouple wherein said fluid is a gas, and said first upstream circumferential junction and second downstream circumferential junction are each of a wedge-shaped longitudinal cross-section, said conduit of said first metal touching said conduit section of said second metal substantially only at a point and the wedge-shaped space between said conduit and said conduit section is filled with a weld of said first metal, whereby the very fast response time flowmeter is provided.

14. A thermal flowmeter to measure the rate of flow of a fluid in a conduit, comprising a first upstream radial junction thermocouple, a second downstream radial junction thermocouple, a heat source to supply substantially constant output heat to at least one of said radial junction thermocouples and to said fluid in said conduit, said heat source being positioned with respect to said first and second radial junction thermocouples to supply more heat to one of said thermocouples than the other, means to detect and measure the differential electrical output between said thermocouples, said differential output being mathematically related to said rate flow of said fluid wherein a conduit of a first metal is uninterrupted and continuous through said flowmeter, a thin sleeve of a second metal, thermoelectrically dissimilar to said first metal, is provided circumferentially around one surface of said conduit, the upstream end of said sleeve comprising said first upstream radial junction thermocouple and the downstream end of said sleeve comprising said second downstream radial junction thermocouple.

15. A thermal flowmeter as set forth in claim 14 wherein said thin sleeve is a plating of a second metal thermoelectrically dissimilar to said first metal, provided circumferentially around the inside of said conduit in the form of an interior sleeve.

16. A thermal flowmeter to measure the rate of flow of a fluid in a conduit, comprising a first upstream radial junction thermocouple, a second downstream radial junction thermocouple, a heat source to supply substantially constant output heat to at least one of said radial junction thermocouples and to said fluid in said conduit, said heat source being positioned with respect to said first and second radial junction thermocouples to supply more heat to one of said thermocouples than the other, means to detect and measure the differential electrical output between said thermocouples, said differential output being mathematically related to said rate of flow of said fluid wherein a conduit of a first metal is uninterrupted and continuous through said flowmeter, said conduit is circumferentially slightly necked inwardly at both the upstream and downstream ends of said flowmeter, a wire of a second metal, thermoelectrically dissimilar to said first metal, is provided circumferentially around said conduit, in each of said necked inwardly portions of said conduit, each of said circumferential wires forming a radial junction thermocouple with said conduit.

17. A thermal flowmeter to measure the rate of flow of a fluid in a conduit, comprising a first upstream radial junction thermocouple, a second downstream radial junction thermocouple, a heat source to supply substantially constant output heat to at least one of said radial junction thermocouples and to said fluid in said conduit, said heat source being positioned with respect to said first and second radial junction thermocouples to supply more heat to one of said thermocouples than the other, means to detect and measure the differential electrical output between said thermocouples, said differential output being mathematically related to said rate of flow of said fluid wherein a conduit of a first metal is uninterrupted and continuous through said flowmeter, said conduit is circumferentially reduced in wall thickness from the outside at both the upstream and downstream ends of said flowmeter, a wire of a second metal, thermoelectrically dissimilar to said first metal, is provided circumferentially around said conduit in each of said reduced portions of said conduit, each of said circumferential wires forming a radial junction thermocouple with said conduit.

* * * * *